June 7, 1932.   C. D. McDONALD ET AL   1,861,542
CAN TESTING MACHINE
Filed Oct. 21, 1929    2 Sheets-Sheet 1
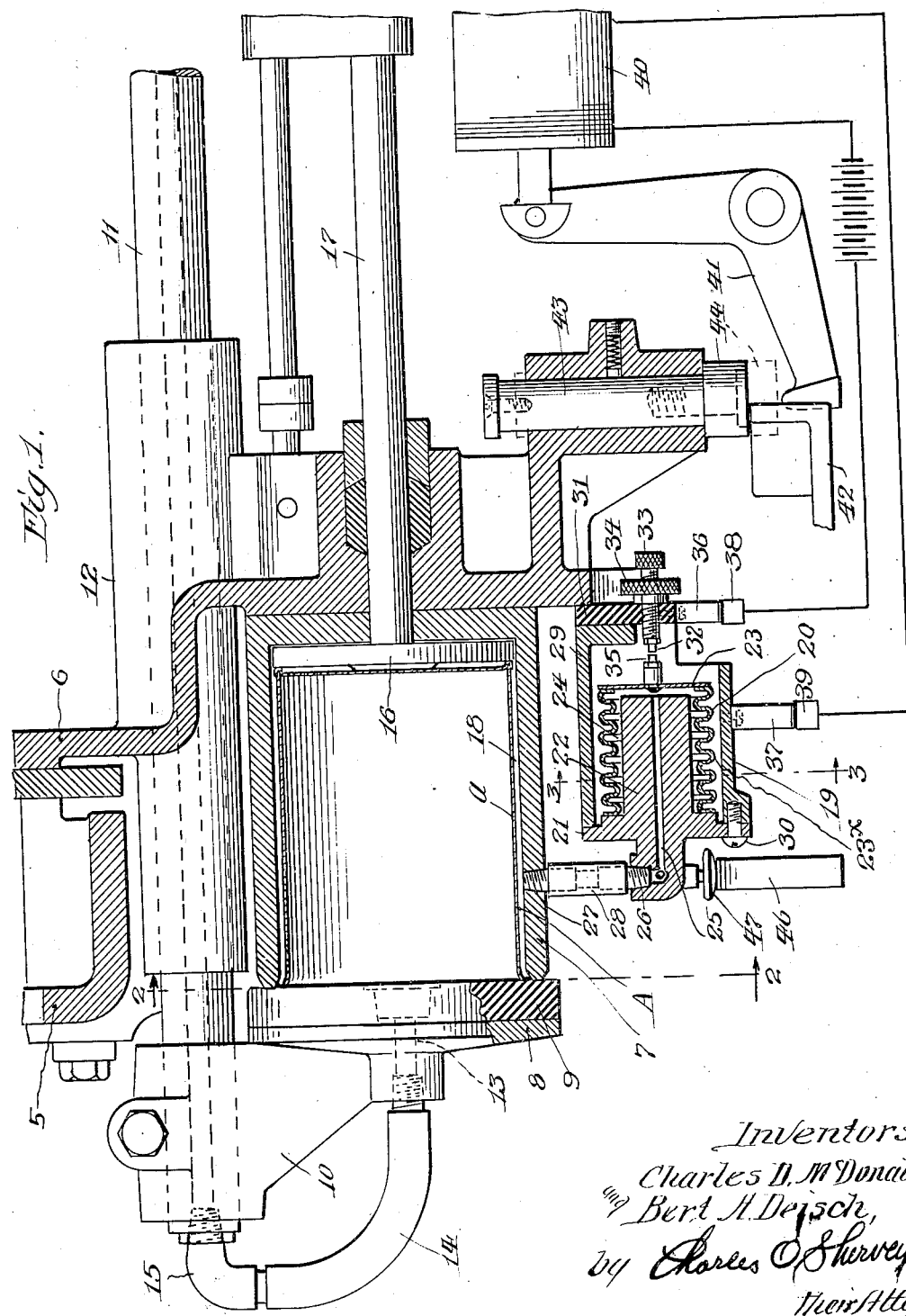
Inventors;
Charles D. McDonald,
Bert M. Deisch,
by Charles O. Hurvey,
their Atty.

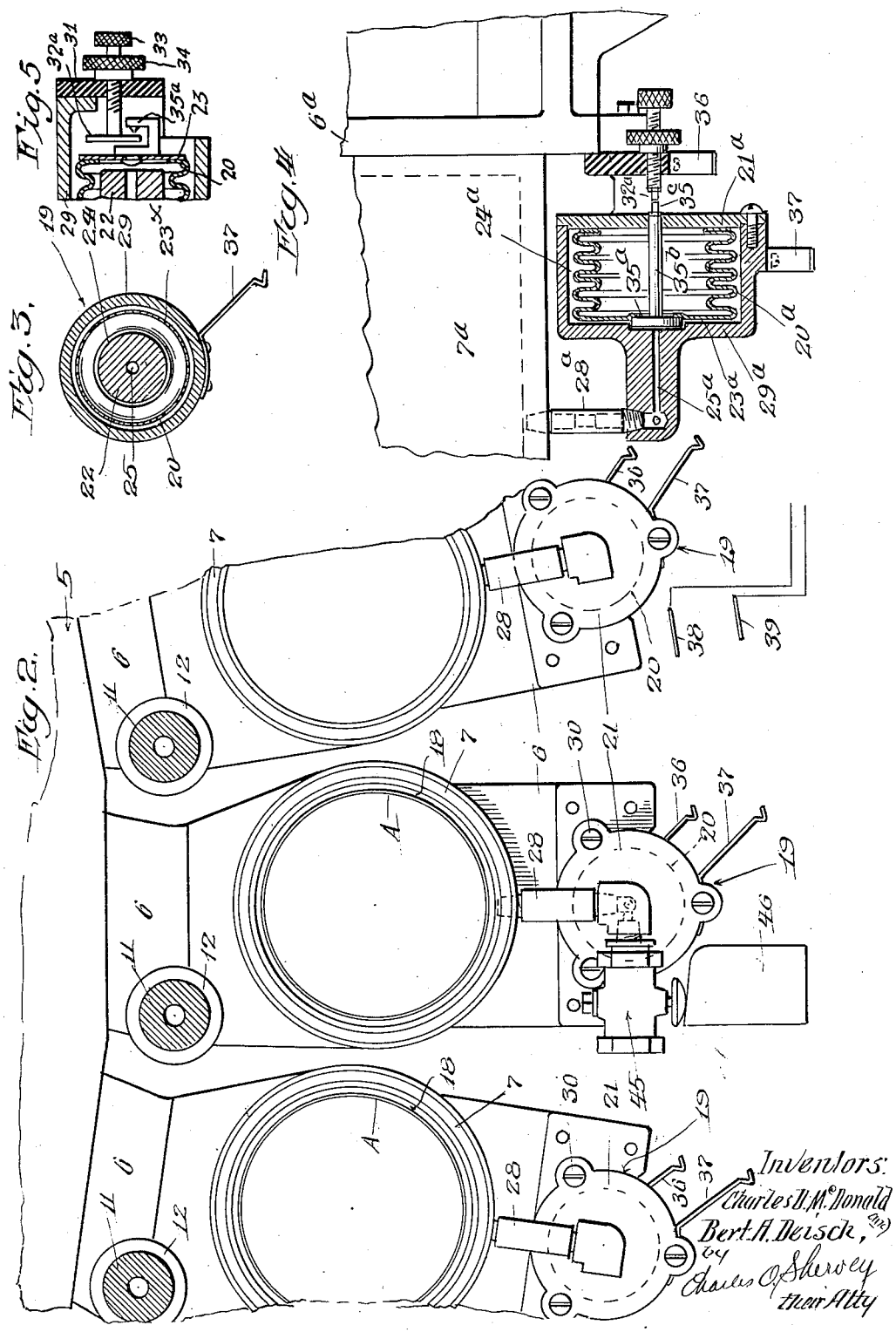

Patented June 7, 1932

1,861,542

UNITED STATES PATENT OFFICE

CHARLES D. McDONALD AND BERT A. DEISCH, OF CHICAGO, ILLINOIS, ASSIGNORS, BY MESNE ASSIGNMENTS, TO CONTINENTAL CAN COMPANY, INC., OF NEW YORK, N. Y., A CORPORATION OF NEW YORK

CAN TESTING MACHINE

Application filed October 21, 1929. Serial No. 401,313.

This invention relates to can testing machines, and its principal object is to increase the efficiency and the capacity of machines of this character. Another object is to provide in a can testing machine, high sensitive pneumatically operated leak detecting devices communicating with chambers in which the cans to be tested are placed and operating to set into motion the mechanism which separates the leaky cans from the whole ones. Another object of the invention is to provide highly sensitive detecting mechanism for detecting minute perforations in the cans quicker than has been accomplished heretofore, whereby the speed of the machine may be greatly accelerated so as to operate upon a greater number of cans within a given period of time.

With these and other objects and advantages in view, this invention consists in a can testing machine having chambers in which the cans are hermetically sealed and provided with restricted spaces within or without the cans communicating with expansible and contractible pneumatically operated means for setting the can selecting mechanism in motion.

It further consists in a can testing machine in which the expansible and contractible leak detecting mechanism embodies a sylphon bellows device operating by a change of pressure from atmospheric pressure to close an electric circuit for the can selecting mechanism, or to otherwise set the can selecting mechanism into action. It further consists in a can testing machine in which the sylphon bellows device is provided with a restricted air space on one side of its expansible wall, whereby its action is greatly accelerated and leaks detected within a minimum period of time.

It further consists in the several novel features of construction, arrangement and combination of parts hereinafter fully set forth and claimed.

The invention is clearly illustrated in the drawings accompanying this specification in which—

Figure 1 is a view, partly in side elevation and partly in central vertical axial longitudinal section, of a fragment of the carrier of a can testing machine, a can testing cylinder, and one of the detectors, forming the subject matter of this invention, and associated parts;

Fig. 2 is a fragmental view, partly in front elevation and partly in vertical cross section, of the parts seen in Fig. 1, the section being taken on the line 2—2 of Fig. 1;

Fig. 3 is a detail vertical cross section taken on the line 3—3 of Fig. 1;

Fig. 4 is a view, partly in side elevation and partly in vertical longitudinal section, of a slightly modified form of the invention, and Fig. 5 is a fragmental view in vertical longitudinal section of a second modified form of the invention.

Referring to said drawings, which illustrate one embodiment of the present invention, the reference character 5 designates a rotatable carrier, usually in the form of a disk-like member or wheel, mounted to rotate upon a horizontal axis. Bolted or otherwise secured to the carrier are brackets 6 disposed circumferentially about the carrier. Secured upon said brackets 6 are can testing cylinders 7, open at one end, into which the cans to be tested are inserted and hermetically sealed by clamping heads 8 which are usually provided with rubber blocks 9 for making tight joints with the cylinders and the cans contained therein.

Each clamping head is carried by an arm 10 mounted upon a reciprocatory rod 11 slidably mounted in a tubular guide 12 formed upon the associated bracket 6, and said rod 11 is reciprocated by suitable mechanism to thereby move the clamping head 8 to and from the cylinder 7. When compressed air is used for testing the cans, it is usually admitted to the interior of the can through the clamping head and, as shown, the rod 11 is made hollow and connects with a passage 13 in the clamping head by a tube 14 having a fitting 15 threadedly secured in the end of the hollow rod 11. In the operation of the machine, the compressed air is forced through the hollow rod 11, fitting 15, tube 14 and clamping head 8 and into the interior of the can.

Operating in conjunction with each clamping head 8 is a plunger 16 which reciprocates in the can testing cylinder 7 and bears against the bottom of the can, thereby holding the open end of the can tightly against the rubber block 9 of the clamping head. The plunger 16 is mounted upon a rod 17 which is operated by suitable mechanism that moves the plunger 16 back and forth in the cylinder. As is well understood, mechanism is provided for rotating the carrier and actuating the clamping head 8 and plunger 16 to clamp the can in place in the cylinder and hermetically seal it therein and to discharge the can from the cylinder after it has been tested for leaks.

Mechanism is provided for discharging the whole and leaky cans through two separate chutes, whereby the whole cans may be separated from the leaky ones, and the testing means forming the subject matter of the present invention is intended to be used in connection with such mechanism, an example of which is more fully set forth and described in my co-pending application for patent on can testing machines, filed September 24, 1928, under Serial No. 308,009, and in the patent to Charles D. McDonald on can testing machines, No. 1,694,132, dated December 4, 1928, to which reference may be had for a complete description of one type of can separating mechanism employed in connection with the detector mechanism, forming the subject matter of this invention.

The can to be tested, and which is designated by the reference character A, is of slightly less diameter than the internal diameter of the cylinder 7, thereby leaving a restricted air space 18 around the wall $a$ of the can. In this restricted space compressed air will find its way in case there is any leak whatsoever in the wall of the can.

Supported upon the bracket 6 for each can testing cylinder 7 is leak detecting mechanism 19, which forms the subject matter of the present invention. In its preferred form, the leak detecting mechanism comprises an expansible and contractible pneumatically operated device 20, such as a sylphon bellows, the interior of which is in communication with the restricted space 18 around the can to be tested. The expansible and contractible wall 23ˣ of the sylphon bellows is secured to and closed by a stationary head 21 formed upon a cylindrical body or core 22 that extends into the interior of the sylphon bellows 20 and terminates adjacent the movable end wall 23 thereof.

The cylindrical body 22 and movable walls of the sylphon bellows form a restricted air space 24 into which any compressed air escaping from the restricted space 18 of the can testing cylinder enters and quickly builds up pressure therein sufficient to move the end wall 23 thereof and make contact between two contact pieces 32 and 35 and thereby close the electric circuit of the can selecting mechanism of the machine. The cylindrical body 22 contains an air duct 25 which is connected to the restricted space 18 by a conduit, here shown as comprising fittings 26 and 27, threadedly secured in the hollow body 22 and cylinder 7, respectively, and a tubular element 28 secured upon said fittings.

The sylphon bellows is supported upon the bracket 6 by a cylindrical shell 29 surrounding the sylphon bellows and secured to the head 21 of the body 22 by screws or the like 30, and a block of insulating material 31 is interposed between the shell 29 and bracket 6 for the purpose of insulating the contact members 32 and 35 from each other. The contact member 32 is stationary and is carried by an adjustment screw 33 threadedly mounted in the insulating block 31 and having a lock nut 34 threaded thereon, whereby said contact member may be adjusted to provide a slight gap between it and the movable contact member 35, which is secured to and moves with the movable end wall 23 of the sylphon bellows.

Electrically connected with the contact members 32 and 35 are brushes or other contact making members 36 and 37 which come into contact with contact pieces 38 and 39 stationarily mounted upon some portion of the frame of the machine adjacent the place where the cans are discharged from the cylinders. Usually the contact pieces 38 and 39 are arranged in an electric circuit, illustrated diagrammatically in Fig. 1, for a solenoid or other electromagnetic device 40 which, when energized, operates a pin setting lever 41 that controls the action of the can selecting mechanism.

The reference character 42 designates a fragment of a track switching lever which operates to switch the leaky cans into one chute and the whole ones into another chute, and 43 designates a reciprocable pin having a roller 44 on one end, which is engaged by the pin setting lever 41 and moved out of line with the lever 42 whenever the solenoid 40 is energized, thereby passing by said lever and permitting the leaky can to discharge into the chute for leaky cans. When a whole can reaches the discharge end of the machine, the solenoid is not actuated, and, consequently, the roller 44 engages the lever 42 which thereupon switches the whole can into another chute.

Inasmuch as the sylphon bellows having the restricted air space therein is extremely sensitive, any slight change in pressure therein acts to operate the bellows and thereby close the electric circuit, and since the act of closing the clamping head upon the cylinder is likely to raise the pressure slightly in the sylphon bellows, means are provided for venting the air conduit between the cylinder and sylphon bellows at the time the clamping action takes place. Said means is here shown as comprising a spring actuated valve 45 (see Fig. 2) secured upon the body 22 of the sylphon bellows and communicating with the air duct therein. Normally the valve 45 is closed.

At the station where the cans are inserted into the cylinders, a stationary cam block 46 is provided, on which the stem 47 of each valve 45 rides and temporarily unseats the valve, thereby venting the sylphon bellows during the clamping action of the clamping head 8. As soon as the valve stem 47 passes the cam block 46, the valve 45 closes and prevents any escape of air from the sylphon bellows and the restricted space around the can which is being tested.

In the operation of the machine, the can to be tested is inserted into the cylinder 7 with its bottom impinging against the plunger 16 and the clamping head 8 is brought down upon the open ends of the cylinder 7 and head 8, thereby clamping the can in place and hermetically sealing it and the cylinder against the outer atmosphere. As has been explained, at this moment the sylphon bellows is vented to the outer atmosphere. Immediately thereafter the valve 45 is closed and compressed air is admitted into the interior of the can. The compressed air may be left on during the entire progress of the can from the receiving end to the discharge end of the machine, if desired, and if there is no leak in the can, the sylphon bellows device remains undisturbed, and at the discharge station of the machine the can is discharged from the cylinder into a chute for whole cans.

If, however, any minute or large leak is present in the can, the compressed air readily enters the restricted space 18 of the cylinder 7 and enters the restricted space 24 of the sylphon bellows and rapidly builds up pressure therein sufficient to expand the bellows and move the contact piece 35 into contact with the stationary contact piece 32, so that when the brushes 36 and 37 contact with the stationary contact pieces 38 and 39 of the solenoid circuit, the solenoid 40 is energized, the lever 41 engages with the pin 43 and the roller 44 is moved to take a path out of line with the switch lever 42, whereby the latter remains inactive and the leaky can is discharged through the chute for leaky cans.

In the modified form illustrated in Fig. 4, the expansible and contractible wall of the sylphon bellows 20ª is secured to a stationary wall 21ª and to the head 35ª of the stem 35ᵇ which carries the movable contact piece 35ᶜ.

In this case, the expansible and contractible wall of the sylphon bellows is contained and hermetically sealed within an outer shell 29ª closed at one end by the wall 21ª and the interior of said shell communicates with the can testing cylinder 7ª through an air duct 25ª and an air conduit 28ª, as in the preferred form.

It will be seen that a restricted space 24ª is provided between the extertior of the expansible and contractible wall of the sylphon bellows and the wall of the shell 29ª. The stationary contact member 32ª is provided, as in the preferred form, and the entire device is carried by the bracket 6ª, substantially as described in connection with the preferred form. In this form of the invention, the compressed air enters the restricted space surrounding the expansible and contractible wall of the sylphon bellows and compresses the bellows instead of expanding them, thereby moving the movable end wall 23ª of the bellows in a direcgon to make contact between the contact pieces 35ᶜ and 32ª.

It is to be observed that the sylphon bellows is caused to operate and thereby close the solenoid circuit upon a change in pressure from atmospheric pressure, and that because of the restricted space within or outside of the sylphon bellows, its action is very sensitive and it acts quicker than any leak detector heretofore employed in can testing machinery.

Vacuum may be employed instead of compressed air for actuating the sylphon bellows, and Fig. 5 illustrates one form of electrical contacts used in connection with the sylphon bellows when vacuum is employed. In this case, the stationary contact piece 32ª on the adjustment screw 33 is in the form of a disk and the movable contact piece 35ª, which is attached to the sylphon bellows wall 23, is in the form of a yoke-like piece that passes around the disk-like contact piece 32ª and makes contact therewith when the sylphon bellows is collapsed under the influence of vacuum.

More or less variation of the exact details of construction is possible without departing from the spirit of this invention. We desire, therefore, not to limit ourselves to the exact form of the construction shown and described, but intend, in the following claims, to point out all of the invention disclosed herein.

We claim as new, and desire to secure by Letters Patent:

1. In a machine of the character described, the combination with a can testing cylinder having a chamber adapted to receive a can therein, means for closing and sealing the chamber and can from the outer atmosphere, there being a restricted space on one side of the can body separated by its wall from the space on the other side thereof, and an expansible and contractible pneumatically operated circuit closing element having a movable wall and a wall in close proximity thereto providing a restricted air space on one side of its movable wall in communication with the restricted space at the can and operated by a change of pressure from atmosphere pressure to close an electric circuit.

2. In a machine of the character described, the combination with a can testing cylinder having a chamber adapted to receive a can therein, means for closing and sealing the chamber and can from the outer atmosphere, there being a restricted space on one side of the can body separated by its wall from the space on the other side thereof, and an expansible and contractible pneumatically operated circuit closing element having a restricted space at the interior side of its wall in communication with the restricted space at the can and operated by a change of pressure from atmosphere pressure to close an electric circuit.

3. In a machine of the character described, the combination with a can testing cylinder having a chamber adapted to receive a can therein, means for closing and sealing the chamber and can from the outer atmosphere, there being a restricted space on one side of the can body separated by its wall from the space on the other side thereof, and a circuit closing sylphon bellows having a restricted space on one side of its movable wall in communication with the restricted space at the can and operated by a change in pressure from atmosphere pressure to close an electric circuit.

4. In a machine of the character described, the combination with a can testing cylinder having a chamber adapted to receive a can therein, means for closing and sealing the chamber and can from the outer atmosphere, there being a restricted space on one side of the can body separated by its wall from the space on the other side thereof, and a circuit closing sylphon bellows having a core therein forming with the movable wall of the bellows a restricted space in communication with the restricted space at the can and operated by a change of pressure from atmosphere pressure to close an electric circuit.

5. In a machine of the character described, the combination with a can testing cylinder having a chamber adapted to receive a can therein, means for closing and sealing the chamber and can from the outer atmosphere, there being a restricted space on one side of the can body separated by its wall from the space on the other side thereof, a circuit closing sylphon bellows having a restricted space within its interior communicating with a restricted space at the can, a movable contact piece carried by a movable wall of the sylphon bellows, and a stationary contact piece cooperating with the movable contact piece to close an electric circuit.

6. In a machine of the character described, the combination with a can testing cylinder having a chamber adapted to receive a can therein, a clamping head for closing and sealing the chamber from the outer atmosphere, means for admitting compressed air to the interior of the can, there being a restricted space surrounding the can, and a circuit closing sylphon bellows having a core therein forming a restricted space within the interior of the bellows communicating with the restricted space around the can, a movable contact piece connected to a movable wall of the sylphon bellows, and a stationary contact piece, both included in an electric circuit for can selecting mechanism.

7. In a machine of the character described, the combination of a can testing cylinder having a chamber adapted to receive a can therein, means for closing the chamber and can from the outer atmosphere, means for conducting compressed air to the interior of the can, and there being a restricted space on one side of the can separated from the space of the other side of the can by the wall thereof, a circuit closing sylphon bellows having a restricted space on one side of its wall in communication with the restricted space at the can, and a valve controlled vent for said restricted spaces.

8. In a machine of the character described, the combination of a can testing cylinder having a chamber adapted to receive a can therein, means for closing and sealing the chamber and can from the outer atmosphere, means for conducting compressed air to the interior of the can, and there being a restricted space on one side of the can separated from the space of the other side of the can by the wall thereof, a circuit closing sylphon bellows having a restricted space on one side of its wall in communication with the restricted space at the can, and a cam operated valve controlled vent for said restricted spaces.

CHARLES D. McDONALD.
BERT A. DEISCH.